United States Patent
Furtenback et al.

(10) Patent No.: US 9,967,785 B2
(45) Date of Patent: May 8, 2018

(54) APPARATUS AND METHODS FOR IMPROVED HANDOVER IN MULTI-OPERATOR SHARED RADIO ACCESS NETWORK COMMUNICATIONS SYSTEMS

(75) Inventors: Ros-Marie Furtenback, Johanneshov (SE); Ulrik Wahlberg, Taby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 2087 days.

(21) Appl. No.: 11/909,373

(22) PCT Filed: Mar. 23, 2005

(86) PCT No.: PCT/SE2005/000443
§ 371 (c)(1),
(2), (4) Date: Sep. 10, 2009

(87) PCT Pub. No.: WO2006/101426
PCT Pub. Date: Sep. 28, 2006

(65) Prior Publication Data
US 2009/0325577 A1    Dec. 31, 2009

(51) Int. Cl.
H04W 36/10    (2009.01)
H04W 36/00    (2009.01)

(52) U.S. Cl.
CPC .................. H04W 36/0061 (2013.01)

(58) Field of Classification Search
CPC ..... H04W 48/18; H04W 36/10; H04W 36/12; H04W 88/10; H04W 36/00
USPC ............. 455/436, 437, 438, 439, 435.2, 434
See application file for complete search history.

(56) References Cited

U.S. PATENT DOCUMENTS

| | | | |
|---|---|---|---|
| 6,826,414 B1 | 11/2004 | Reynolds et al. | |
| 2002/0105927 A1* | 8/2002 | Holma et al. | 370/331 |
| 2002/0151304 A1 | 10/2002 | Hogan | |
| 2002/0193139 A1* | 12/2002 | Mildh et al. | 455/552 |
| 2003/0013443 A1* | 1/2003 | Willars et al. | 455/432 |
| 2003/0224794 A1* | 12/2003 | Kim et al. | 455/445 |
| 2004/0017798 A1* | 1/2004 | Hurtta et al. | 370/352 |
| 2004/0029587 A1 | 2/2004 | Hulkkonen et al. | |
| 2004/0092259 A1 | 5/2004 | Blane et al. | |

(Continued)

FOREIGN PATENT DOCUMENTS

| | | |
|---|---|---|
| EP | 1 107 622 A1 | 6/2001 |
| WO | WO 02065805 | 8/2002 |
| WO | WO 02065806 | 8/2002 |

(Continued)

OTHER PUBLICATIONS

3GPP TS 23.251 V6.0.0 (Jun. 2004) 3rd Generation Partnership Project; Technical Specification Group Services and System Aspects; Network Sharing; Architecture and functional description (Release 6).

(Continued)

*Primary Examiner* — Lester G Kincaid
*Assistant Examiner* — Dung L Lam
(74) *Attorney, Agent, or Firm* — Sage Patent Group

(57) ABSTRACT

The present invention relates to handover in a communications system, and more especially it relates cell change using Iu-interface dependent neighbor-cell lists, particularly in a Universal Mobile Telecommunications System, UMTS or WCDMA system.

6 Claims, 4 Drawing Sheets

(56) References Cited

U.S. PATENT DOCUMENTS

2004/0105429 A1 6/2004 Anckar et al.
2004/0185884 A1* 9/2004 Marin et al. .................. 455/466

FOREIGN PATENT DOCUMENTS

| WO | WO 02065807 | 8/2002 |
| WO | WO 02065808 | 8/2002 |
| WO | WO 2004/075576 | 9/2004 |

OTHER PUBLICATIONS

3GPP TS 25.401 V5.9.0 (Sep. 2004) $3^{rd}$ Generation Partnership Project; Technical Specification Group Radio Access Network; UTRAN overall description (Release 5).

3GPP TS 25.413 V5.10.0 (Sep. 2004) 3rd Generation Partnership Project; Technical Specification Group Radio Access Network; UTRAN lu interface RANAP signalling (Release 5).

3GPP, $3^{rd}$ Generation Partnership Project; Technical Specification Group Services and System Aspects; Network Sharing; Architecture and Functional Description (Release 6), TS 23.251 v6.2.0 Dec. 2004.

\* cited by examiner

Network per Iu-interface

| Iu-interface | Network operator |
|---|---|
| m | mccA/mncA |
| n | mccB/mncB |
| ⋮ | ⋮ |

I1 → row 1, I2 → row 2

Neighboring cell list for cell X7

| Neighbor cell | Network operator |
|---|---|
| x6 | mccO/mncO |
| x8 | mccO/mncO |
| A | mccA/mncA |
| B | mccB/mncB |
| ⋮ | ⋮ |

N1 → header, N2 → x6, N3 → x8, N4 → A

APPARATUS AND METHODS FOR IMPROVED HANDOVER IN MULTI-OPERATOR SHARED RADIO ACCESS NETWORK COMMUNICATIONS SYSTEMS

TECHNICAL FIELD OF THE INVENTION

The present invention relates to handover in a communications system, and more especially it relates to cell change using Iu-interface dependent neighbor-cell lists, particularly in a Universal Mobile Telecommunications System, UMTS or WCDMA system.

BACKGROUND AND DESCRIPTION OF RELATED ART

Mobile operators are known to share radio communications networks in order to share costs of network operations and establishment, which are extensive, particularly in the rollout phase.

$3^{rd}$ Generation Partnership Project (3GPP): *Technical Specification Group Services and System Aspects; Network Sharing; Architecture and functional description* (Release 6) 3G TS 23.251 v6.0.0, France, June 2004, covers the details of Network Sharing. It shows how several core network operators can share one radio access network and details the impacts on the network architecture. All UE (User Equipment) entities shall also comply with other requirements for network-sharing supporting UE entities, among them PLMN selection and system information reception. Chapter 4 of the 3GPP specification describes multi-operator core network, MOCN.

An operator may select not to share its entire network but only have part of it in common with one or more other operators. For such networks and operators, prior art identifies a problem of handover related to a user communicating over a radio base station, RBS, in the shared part of the network being handed over to communicate over a base station that is not shared with one or more other operators.

FIG. 1 illustrates a handover from an MOCN radio network to an individual network of one of a plurality of partners sharing the MOCN.

To simplify the description, cells from which handover may occur to non-shared cells from shared cells and vice versa are called border cells.

$3^{rd}$ Generation Partnership Project (3GPP): *Technical Specification Group Radio Access Network; UTRAN overall description* (Release 5) 3G TS 25.401 v5.9.0, France, September 2004, describes the overall architecture of the UTRAN (Universal Terrestrial Radio Access Network), including internal interfaces and assumptions on the Iur and Iu interfaces. Iur interfaces are also referred to as radio-interfaces.

$3^{rd}$ Generation Partnership Project (3GPP): *Technical Specification Group Radio Access Network; UTRAN Iu interface RANAP signaling* (Release 5) 3G TS 25.413 v5.10.0, France, September 2004, specifies the radio network layer signaling protocol called Radio Access Network Application Part (RANAP) for the Iu interface. RANAP supports the functions of Iu interface by signaling procedures defined in this document.

The 3GPP technical specifications TS 25.401 and TS 25.413 presents a solution to the handover problem described above by specifying Shared Network Areas, SNAs, and by using shared network access control.

With a multi-operator core network, MOCN, according to 3GPP TS 23.251, the radio network will know all cells/base stations to which it is possible to hand over a call. Particularly, it will know all neighbor cells belonging to the various one or more operators, with which it shares a (sub-)network. However, the core network will only know neighbor cells belonging to the individual network.

In case a suggested border cell is not recognized by core network, handover to such a cell can be rejected. Thereby a call is guaranteed to be handed over to non-shared border cells/network of correct operator.

International Patent Applications WO02065805, WO02065806, WO02065807 & WO02065808 describe a method and system of partial support of mobility between radio access networks comprising a shared cellular radio access network. The patent applications reveal precluding user equipment from: utilizing a restricted cell, for which the subscription operator has a competing cell. Rejected utilization can be handover to, or cell/URA updating via, a restricted cell. In response to a handover attempt, the protecting control node of the auxiliary operator network obtains, from an initiating operator's network, a user equipment IMSI (International Mobile Subscriber Identity) and an identification of the target cell sought by the handover. The protecting control node uses the IMSI to determine whether the target cell is a restricted cell, and (if so) notifies the initiating operator's network that the handover is rejected.

None of the cited documents above discloses a method and system of handover in a shared radio access network environment using Iu-interface dependent neighbor-cell lists.

SUMMARY OF THE INVENTION

Costs of configuring and coordinating data related to shared network access between core network and radio access network are often extensive. In prior art, special arrangements may be required for correctly handing over roaming subscribers. Core network rejection of connection handover to unknown cells, according to prior art, would increase the risk of handover failure.

Consequently, it is an object of the invention to provide a method and system, not requiring particular discriminating operations for its various users as regards handover procedure, such that connections are handed over correctly between cells/base stations irrespective of whether a user is connected over a core network of his home PLMN or of another PLMN.

A further object is to incorporate data from an available interface of a radio communications system for a new purpose of handover.

It is also an object to provide candidate cell/base station selection based upon the incorporated data.

Finally, it is an object to provide a method and system of connection handover between cells/base stations of improved reliability and reduced costs.

These objects are met by the invention, which is particularly well suited for a universal mobile telecommunications system.

Preferred embodiments of the invention, by way of examples, are described with reference to the accompanying drawings below.

DESCRIPTION OF PREFERRED
EMBODIMENTS

A drawback of the SNA approach described in 3GPP technical specifications TS 25.401 and TS 25.413 is that it requires support from both core network and radio access network. Another drawback is required configuring and coordinating of data in both core network and radio access network In relation to International Patent Applications WO02065805, WO02065806, WO02065807 & WO02065808 it is observed that a list of available neighbor cells, configured by the operator, can be filtered before it is sent to user equipment, UE, in a Measurement Control message. Thereby, UE can be prevented from performing measurements on base stations filtered out. Consequently, a call will not be handed over to a cell/base station not included in the list.

Figure 1:
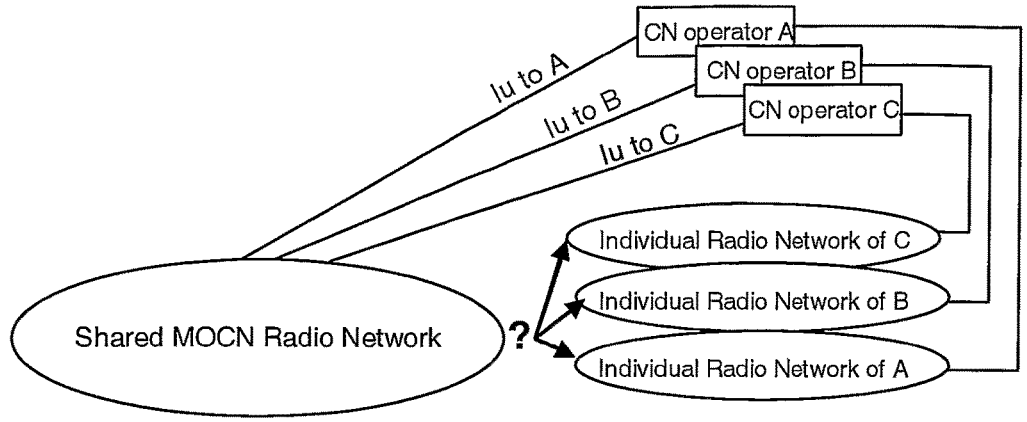
FIG. 1 illustrates a handover from an MOCN radio network to an individual network of one of a plurality of partners sharing the MOCN.
Figure 2:
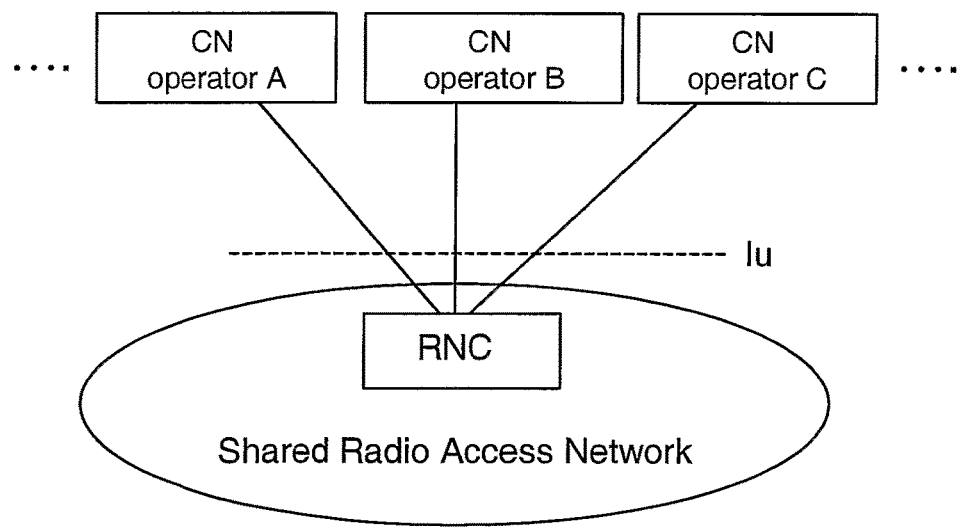
FIG. 2 displays a radio access network shared between three operators. The core networks of the operators are connected to one or more RNCs of the shared radio access network over an Iu interface, according to the invention.

FIG. 2 displays a RAN (Radio Access Network) «Shared Radio Access Network» shared between three operators, A, B and C. The core networks of the operators «CN operator A», «CN operator B», «CN operator C» are connected to one or more RNCs (Radio Network Controllers) «RNC» of the shared RAN over an Iu interface «Iu».

The instant invention adopts filtering of a neighbor-cell list of available neighbor cells, wherein cell not allowed for handover are cancelled prior to the list being forwarded to user equipment. In contrast to prior art it does not rely on IMSI but RNC of a shared RAN (Radio Access Network) is instructed to exclude handover candidates from a neighbor-cell list depending on identity of the Iu interface over which the user equipment is connected to the core network.

Figure 3:
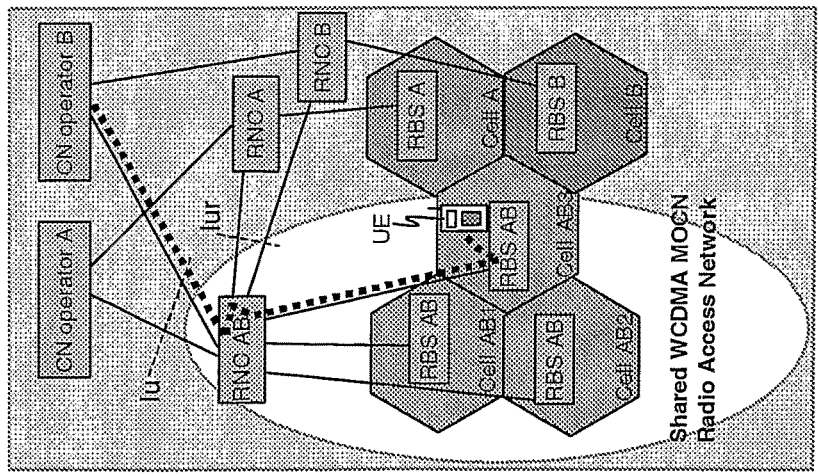
FIG. 3 illustrates a first example situation of handover of user equipment from a shared cell to a non-shared cell according to the invention.

FIG. 3 illustrates a first example situation of handover of user equipment from a shared cell «Cell AB3» to a non-shared cell «Cell B» according to the invention. In the illustrated example network there are three shared cells «Cell AB1», «Cell AB2», «Cell AB3», each with a serving base station «RBS AB», the cell being an area served by the base station. There can be more than one base station in each cell.

Figure 4:
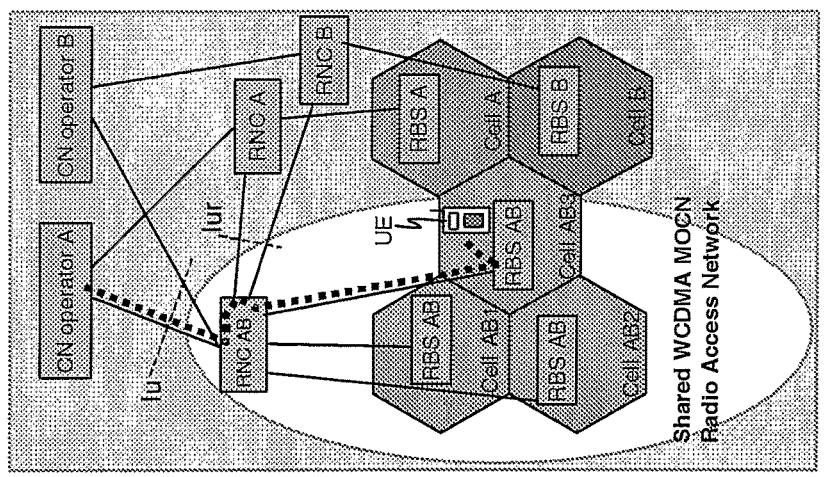
FIG. 4 illustrates a second example situation of handover of user equipment from a shared cell to a non-shared cell according to the invention.
Figure 5:
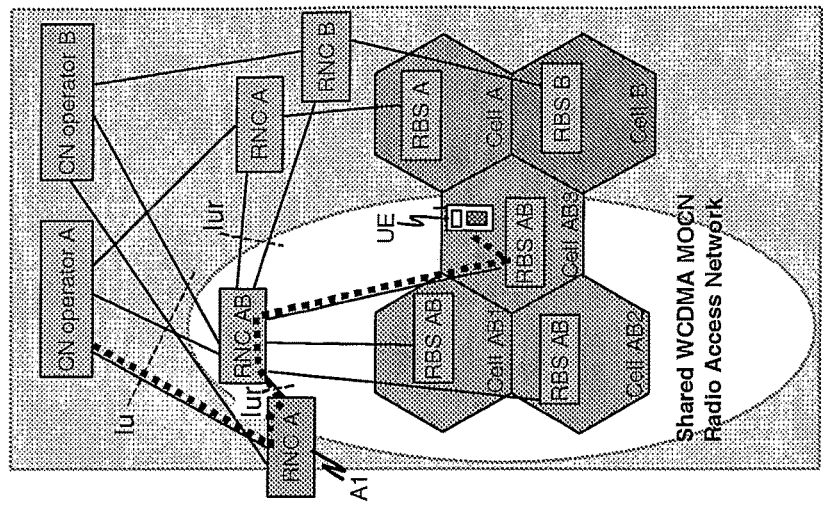
FIG. 5 illustrates a third example situation of handover of user equipment from a shared cell to a non-shared cell according to the invention.

The current user equipment «UE» is served by operator B, e.g. due to a roaming agreement with the operator with which the user of the user equipment has a subscription or operator B being the operator providing the subscription. In FIGS. 3-5, the RNC «RNC AB» controlling the shared base stations is a shared base station «RNC AB». According to the invention, the RNC «RNC AB» maintains data per Iu-interface, illustrated in FIG. 6.

Figures 6, 7, 8:
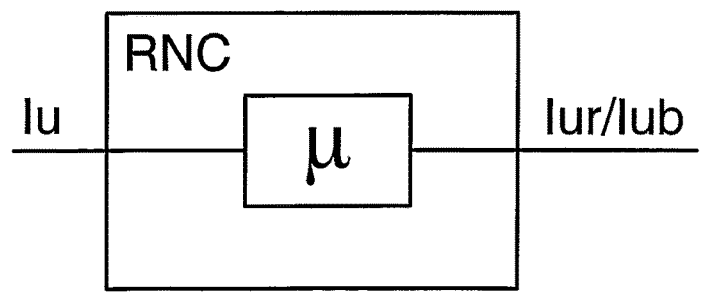
FIG. 6 illustrates example data per Iu-interface maintained by RNC according to the invention.
FIG. 7 illustrates an example neighbor-cell list for maintaining data per neighbor cell in RNC according to the invention.
FIG. 8 illustrates schematically a radio network controller, RNC according to the invention.

The RNC «RNC AB» maintains data per Iu-interface, preferably configured by operator, whereby operator network can be identified. The RNC «RNC AB» is also assumed to maintain data per neighbor cell, e.g. in a neighbor-cell list as illustrated in the example of FIG. 7. The neighbor-cell list identifies the operator of a particular cell/base station neighboring a current cell/base station serving a particular user equipment unit.

In FIGS. 3-5 a user equipment unit in a shared cell is to be handed over to a non-shared border cell. Cells of both operators A and B are handover candidates and are assumed to fulfill the minimum requirements for handover, notwithstanding the fact that either operator may not allow the handover.

In FIG. 3, an operator-B user equipment unit, or rather its connection, is barred from being handed over to a candidate cell of operator A «Cell A». In FIG. 4 an operator-A user equipment unit is correspondingly barred from being handed over to the candidate cell of operator B «Cell B». In both examples of FIGS. 3 and 4, the RNC «RNC AB» is assumed to be shared between the two example operators A and B. In FIG. 5 the call is illustrated to be initiated in non-shared part of RAN of operator A. The RNCs «A1», «RNC AB» then need communicate, similarly to any situation where serving RNC, corresponding to RNC A «A1», is different from a drift RNC, corresponding to RNC «RNC AB» of the shared RAN. The different RNCs then communicate over an Iur interface. The handover filtering of the neighbor list is preferably made in the RNC «RNC AB» with knowledge of the cells neighboring the cells it controls, irrespective of whether it is a drift RNC or serving RNC. Since the user equipment unit is served by operator A, it is barred from being handed over to the candidate cell «Cell B» of operator B.

FIG. 6 illustrates an example list of maintained data per Iu frame in an RNC «RNC AB» of a shared RAN «Shared Radio Access Network». In the figure there are two explicitly illustrated example Iu-interfaces m «I1» and n «I2», and a plurality of possibly additional Iu interfaces. For each Iu interface the list also comprises a corresponding network operator according to its MCC «MCCA», «MCCB» and MNC «MNCA», «MNCB».

FIG. 7 shows an example neighbor-cell list of cells being neighbors to cell x7 in FIGS. 3-5. For shared cells, «MCCo» and «MNCo» are those of the shared (sub-)network, whereas «MCCA», «MCCB» and «MNCA», «MNCB» of those of the individual (non-shared) (sub-)networks.

With reference to FIGS. 3-5, prior to the RNC «RNC AB» sending out a Measurement Control Message (the message as such being defined by 3GPP) including potential cell candidates for handover, cells barred from handover are cancelled from the list according to the invention. The cell candidates remaining in the list correspond to base stations whose broadcast signals the user equipment is expected to measure on for handover purposes by (shared) RAN.

FIG. 8 illustrates schematically a radio network controller, RNC, interconnecting at least one Core Network, CN, over an Iu interface «Iu» and at least one base station, over an Iub interface «Iur/Iub» or at least one RNC over an Iur interface «Iur/Iub» in an example WCDMA radio communications network. The RNC comprises one or more processing means «µ» filtering data from the Iu interface for achieving operator data according to the invention for inclusion or exclusion of operators in a neighbor-cell list as described above.

Figure 9:
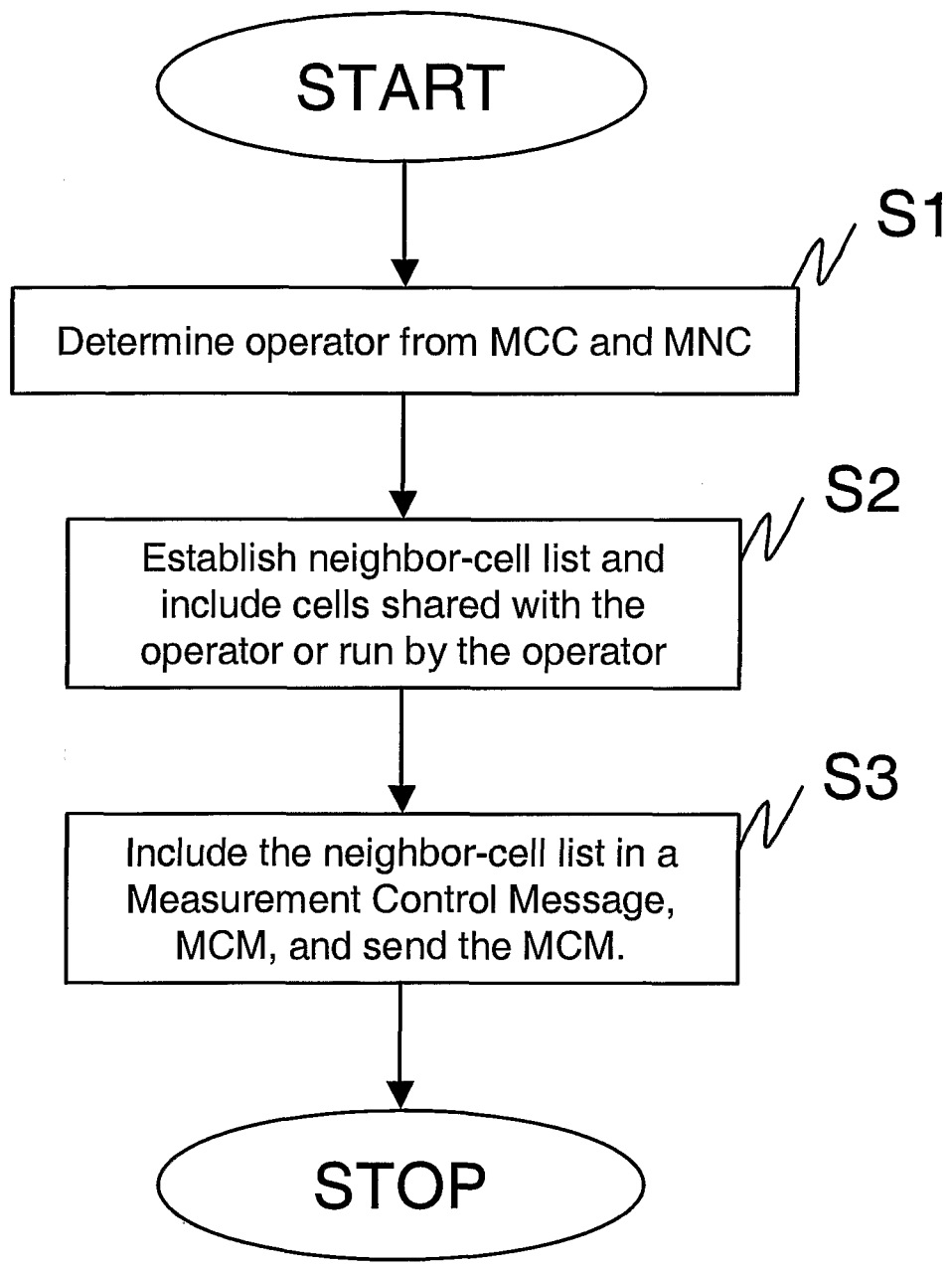
FIG. 9 illustrates schematically a flowchart for a method according to the invention.

FIG. 9 illustrates schematically a flowchart for a method according to the invention. The method is preferably performed by processing means adapted therefore in RNC or apparatus connected to RNC.

A filtering entity will determine from MCC and MNC of the Iu interface which operator is responsible for a particular connection, session or call, as earlier described in relation to FIG. 6 «S1». Cells/base stations that are neither shared cells/base stations nor non-shared cells/base stations of the serving operator are removed from the list «S2». For the example situation illustrated in FIG. 3, cells/base stations x6 «N1», x8 «N2» and B «N4» will remain in the list included in a Measurement Control Message but not cell/base station A «N3». For the example handover situations illustrated in FIGS. 4 and 5, cells/base stations x6 «N1», x8 «N2» and A «N3» will remain in the list included in a Measurement Control Message but not cell/base station B «N4».

The resulting list of neighbor cells is sent to the user equipment unit «UE» in a Measurement Control Message.

A person skilled in the art readily understands that the receiver and transmitter properties of a base station or a UE are general in nature. The use of concepts such as RBS, UE or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without subscriber identity module, SIM, as well as user equipment including one or more SIMs. Further, protocols and layers are referred to in close relation with UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method for connection handover between cells or base stations of an at least partly shared radio access network of a radio communication system, the method comprising the steps of:
   determining at a shared radio access network node, a serving operator associated with a user equipment according to an identity of an interface between the radio access network node and a core network of the radio communications system, the serving operator determined using a table that associates the identity of the interface with the serving operator, wherein the interface is an Iu interface of a Wideband Code Division Multiple Access (WCDMA) system;
   establishing at the shared radio access network node a neighbor-cell list including cells shared with or run by the serving operator and excluding cells run by a second operator not shared with the serving operator, the second operator not serving the user equipment;
   transferring the neighbor-cell list to the user equipment involved in the connection; and
   facilitating in the handover of the user equipment to a cell on the neighbor cell list.

2. The method according to claim 1, wherein the neighbor-cell list is included in a Measurement Control Message for transfer to the user equipment.

3. A radio access network element, the radio access network element being connected to a core network and one or more base stations or one or more radio network controllers, the radio access network element comprising:
   a processor for processing a neighbor-cell list for a user equipment associated with a serving cell and for identifying an interface to the core network that identifies a serving operator of the serving cell, the serving operator determined using a table that associates the identity of the interface with the serving operator, the neighbor-cell list being processed to include cells shared with or run by the serving operator and to exclude cells run by network operators other than the serving operator and not shared with the serving operator depending on the identity of the interface,
   wherein the interface is an Iu interface of a Wideband Code Division Multiple Access (WCDMA) system and wherein the network operators other than the serving operator are not serving the user equipment; and
   an interface for transferring the neighbor-cell list to the user equipment; and
   wherein the processor is further configured to facilitate in the handover of the user equipment to a cell on the neighbor cell list.

4. The radio access network element according to claim 3, wherein the processor is arranged for inclusion of information provided by the serving operator and extracted from communications over the interface.

5. The radio access network element according to claim 3, wherein the processor is arranged for exclusion of information in the neighbor-cell list related to one or more serving operators not identified by information extracted from communications over the interface.

6. The radio access network element according to claim 3, wherein the radio access network element is a radio network controller.

* * * * *